ALDONYL AMIDES OF AMINO ACID ESTERS

John J. Jonas, Sayville, N. Y., assignor, by mesne assignments, to National Dairy Products Corporation, New York, N. Y., a corporation of Delaware No Drawing. Application April 13, 1953,
Serial No. 348,569

11 Claims. (Cl. 260—112)

The present invention relates to aldonamidoesters, more precisely called N-aldonyl amino acid esters, which are aldonic acid derivatives whose carboxylic carbon atom is linked by an amide linkage to the amino nitrogen atom of an alpha amino carboxylic acid higher aliphatic ester, and to a process for preparing such compounds.

The compounds N-arabonyl methyl glycinate and N-arabonyl ethyl glycinate have been reported in the literature by W. E. Van Wijk [Rec. trav. Chim. des Pays Bas., vol. 40, p. 226 (1921)], who prepared the named compounds by reacting arabonyl lactone with methyl glycinate and ethyl glycinate, respectively.

Other N-aldonyl derivatives of the ethyl esters of various amino carboxylic acids have been reported by David G. Doherty [XII, Int. Congr. of Pure and Applied Chem., p. 98 (1951)]. Doherty's compounds were made by reacting fully acetylated aldonyl acid halides with ethyl esters of amino carboxylic acids yielding polyacetyl N-aldonyl derivatives of the amino carboxylic acid esters. The polyacetyl intermediates were then catalytically deacetylated. It is observed that neither of the publications discussed hereinabove discloses the preparation of N-aldonyl alpha amino carboxylic acid esters higher than the ethyl esters.

The compounds of this invention are N-aldonyl amino carboxylic acid aliphatic esters which can be regarded as esters of higher aliphatic alcohols; i. e., alcohols having at least 12 carbon atoms. The compounds can be prepared in several ways which will be apparent to those skilled in the art but the preferred procedure involves reacting the amino acid ester with a lactone or an ester of the corresponding aldonic acid. In this reaction, the amino nitrogen atom of the amino acid ester is linked to the carboxylic carbon of the aldonic acid forming an amide.

The preferred compounds of the present invention are N-aldonyl alpha-aminocarboxylic acid higher aliphatic esters. The higher aliphatic portion of the ester radical is an alkyl group of from twelve to about eighteen carbon atoms, such as lauryl, myristyl and stearyl. The amino group is secondary or tertiary; if tertiary, it can for instance be part of a heterocyclic ring, as in proline, or it can bear an alkyl or hydroxyalkyl radical. The alpha carbon atom in addition to bearing the amino group can be substituted by hydrogen, an aliphatic radical, an aryl radical, an alkaryl radical, an aralkyl radical, a heterocyclic radical, or a mixed aliphatic-heterocyclic radical. The aliphatic radical, in addition to carbon and hydrogen, can contain oxygen, nitrogen and sulfur, and can have a branched or straight chain or with the amino group form a heterocyclic ring, and thus for example can include additional amino groups attached either to a straight chain or as part of a heterocyclic ring, thio groups, thiol groups, hydroxyl groups, amido groups, and a second carboxylic or carboxylic ester group.

Suitable alpha-aminocarboxylic ester nuclei from which the compound can be regarded as derived include, for example, the lauryl, myristyl, stearyl and analogous esters of such amino acids as methionine, cystine, glycine, histidine, leucine, arginine, lysine, isoleucine, valine, serine, phenylalanine, threonine, proline, tyrosine, glutamic acid and aspartic acid. These acids can be used alone or in admixture as, for example, the mixture of these acids obtained by the hydrolysis of casein. The linear polymers of such acids also are useful.

Typical aldonic acid nuclei include gluconic acid, lactobionic acid, ascorbic acid, maltobionic acid, galactonic acid, and the like. Any aldonic acid compound that is reactive with the amino acid ester can be used although the acids themselves are not suitable because ammonium salts are formed instead of aldonamidoesters. The aldonic acid compound is preferably reacted with the amino acid ester as the lactone or as an alkyl ester in which preferably the alkyl group contains from 1 to about 3 carbon atoms.

In accordance with this invention, it has been found that the N-aldonyl derivatives of the amino carboxylic acid higher aliphatic esters possess properties entirely different from those of the known lower homologues. The compounds of the present invention are generally characterized by a high degree of surface activity, by gel-forming ability and by solubility or dispersibility in fats and oils. Because of these properties the compounds are useful as emulsifying agents and by virtue of their non-toxicity the compounds are especially suitable as emulsifying and/or dispersing agents for aqueous systems containing edible fats or oils.

That the above-mentioned properties are not possessed by the known lower homologues is shown in the following table which presents a comparison of certain properties of N-lactobionyl ethyl glycinate with the properties of representative compounds of this invention:

TABLE I

| Name of Compound | Surface Tension, Dynes/cm. 25° C., 0.1% Soln. in Water | 0.1% Soln. in Water, Formation of— | | Dispersibility in Oils and Fats | Emulsifying Ability |
|---|---|---|---|---|---|
| | | Gel | Foam | | |
| N-lactobionyl-ethyl glycinate | 58 | No | No | None | None. |
| N-lactobionyl lauryl glycinate | 36 | No | Stable Foam | Dispersible | Strong. |
| N-lactobionyl-myristyl glycinate | 37 | Strong gel formtn. | Moderate | do | Do. |
| N-lactobionyl-stearyl glycinate | 45 | do | No | Soluble | Do. |
| N-gluconyl-stearyl glycinate | 47 | do | None | Dispersible | Moderate. |

The data shows that the compounds of this invention possess far greater ability to lower surface tension than does the ethyl ester. Similarly the compounds of the invention have emulsifying ability while the lower homologue does not. Again, the compounds of the invention are soluble or dispersible in oils and fats while the ethyl homologue is not.

The reaction will proceed upon the mere mixing of the reactants at ordinary temperatures. However, it is preferred to carry out the reaction in an inert vehicle in which at least one of the reactants is soluble. Anhydrous alcoholic solvents such as methanol, ethanol and ethylene glycol monomethyl ether are particularly suitable vehicles because the use of such vehicles enables the recovery of the reaction product by precipitation which will occur when part of the vehicle is removed by evaporation.

The reaction is accelerated by heat and it is preferred to employ temperatures in the range of from about 40° C. to about 70° C. At temperatures materially higher than 70° C., the amino acid ester reactant readily undergoes polymerization and decomposition. As a result, not only is the yield decreased but also difficultly removable contaminants are formed.

As the reaction proceeds, the mixture gradually approaches neutrality due to the neutral nature of the amide linkage which is formed. As a result, the termination of the reaction is conveniently indicated by the neutrality of the mixture.

The recovery of the final product, when alcoholic vehicles are used, can be achieved by concentration of the reaction mixture to a thick syrup which on cooling solidifies with precipitation of the solid product which may be isolated by filtration.

The amino acid ester reactant is preferably employed in the form of a free base. However, in cases where the free base is unstable, there can be employed the corresponding acid salt, e. g., the hydrochloride, and the acid salt may be converted in situ to the free base by reaction with a weak base such as ammonia, pyridine or sodium methoxide.

The following examples are presented for the purpose of illustrating the invention. Percentages are by weight.

*Example 1.—Preparation of N-lactobionyl stearyl glycinate*

Into a reaction vessel equipped with a stirrer, thermometer and reflux condenser, there was placed 3.3 g. of stearyl glycinate dissolved in 50 ml. of absolute methanol. 3.4 g. of crystalline lactobionic acid delta lactone was added. The mixture was heated to reflux with stirring and in a short time most of the suspended lactone went into solution and after 2 hours of refluxing the reaction was complete leaving only a very small amount of undissolved material which was removed by filtration. A portion of the reaction product solidified on cooling and this was filtered off and washed with methanol and ethyl ether. Additional amounts of reaction product were recovered similarly after removal of the alcohol by concentration. The yield was approximately 70% of theoretical.

The product of this example is a white to slightly tan colored, tasteless and odorless material having a melting point between 110° and 115° C. The surface tension of a 0.1% aqueous solution of the reaction product is 45 dynes/cm. at 25° C. The product can be crystallized from solvents such as hot methanol, ethanol or ethylene glycol monomethylether.

The compound is only sparingly soluble in cold water (0.1%). About 1 to 2% of the compound can be dissolved in water by heating to moderate temperatures (about 50 to 60° C.), resulting in a viscous, soap-like solution. On cooling of this solution, a clear, stable gel is formed.

The compound is soluble up to about 10% in the lower molecular weight alcohols at room temperatures. Its solubility in higher alcohols is poor. Its solubility in benzene, ether and acetone is less than 0.1% at room temperature. The solubility in oils is generally low but the finely powdered compound disperses easily in oils and evidences gel-forming ability.

The N-lactobionyl stearyl glycinate is heat-stable at temperatures up to 120° C. It is fairly stable against the action of weak acids and alkalies at room temperature but strong acids or bases cause hydrolysis of the ester, amide or glycoside linkage, the hydrolysis being accelerated by higher temperatures.

In employing the compound as an emulsifying agent, the best results are achieved by first dissolving the compound in warm water and then adding the oil or fat component to the solution. About 0.1 to 0.2% of the compound is effective in promoting emulsification. The compound is especially suitable for emulsifying aqueous systems containing about 10 to 60% of benzene or homologous compounds. Several phenolic compounds, e. g., tertiary butyl phenol, thymol and methyl salicylate can also be emulsified in water using the compound as the sole emulsifying agent.

In emulsifying edible fats and oils, about 0.1% of the N-lactobionyl stearyl glycinate is effective and the normally desirable high level of dispersion can be achieved by the use of mechanical homogenizers or similar equipment.

*Example 2.—Preparation of N-gluconyl stearyl glycinate*

Into a suitable reaction vessel equipped with a thermometer, stirrer and reflux condenser there was charged 3.6 g. of stearyl glycinate hydrochloride dissolved in 50 ml. of absolute methanol. There was added at room temperature one stoichiometric equivalent of anhydrous ammonia as a one normal solution in absolute methanol. Under these conditions the ammonia reacted almost instantaneously with the hydrochloride portion of the stearyl glycinate salt to liberate the free base. There was then added 1.78 g. of the delta lactone of gluconic acid and the resulting suspension was heated to reflux with stirring. As the refluxing of the mixture continued, the lactone dissolved and the reaction mixture became neutral in approximately one hour.

Upon cooling of the reaction mixture a small portion of the reaction product precipitated. The remainder of the product was isolated by concentrating the reaction mixture to a thick syrup and on cooling of this syrup the reaction product solidified and was recovered by filtration. The yield was approximately 80% of theoretical.

The product is a white crystalline material having a melting point between 118° and 122° C. The surface tension of a 0.1% aqueous solution of the reaction product is 47 dynes/cm. at 25° C. The product is poorly soluble in water, fairly soluble in alcohols and insoluble in acetone, benzene and petroleum ether. It is dispersible in fats and oils and is capable of forming emulsions of fat in water.

*Example 3.—Preparation of N-ascorbyl stearyl glycinate*

Into a suitable reaction vessel equipped with a stirrer, thermometer and reflux condenser there were added 10.9 g. of stearyl glycinate hydrochloride dissolved in 90 ml. of hot methanol. The stearyl glycinate hydrochloride was converted into the free base by reaction with ammonia as described in Example 2. There was next added 5.28 g. of the delta lactone of ascorbic acid and the mixture was refluxed under an atmosphere of nitrogen for a short period of time. The product was recovered by the same method employed in Examples 1 and 2. The yield was approximately 80% of theoretical.

The N-ascorbyl stearyl glycinate prepared in this example is a white solid which decomposes on heating. The melting point of the compound is 65° to 67° C. It is poorly soluble in water, fairly soluble in alcohols and insoluble in acetone, benzene and petroleum ether.

*Example 4.—Preparation of N-lactobionyl lauryl glycinate*

Into a suitable reaction vessel equipped with a thermometer, stirrer and reflux condenser there was placed 2.79 g. of lauryl glycinate hydrochloride dissolved in absolute methanol. The hydrochloride was converted to the free base by reaction with ammonia as described in Example 2. There was then added 3.72 g. of methyl lactobionate and the resulting mixture was refluxed for about 8 hours. Thereafter most of the methanol was removed by concentration to yield an oily residue. After treating the oily residue with anhydrous ether several times, the reaction product solidified and a hygroscopic powder was obtained which was dried in vacuo in the presence of concentrated sulfuric acid as a desiccant. The yield was approximately 50% of the theoretical yield.

The melting point of the reaction product is between 80° and 83° C. A 0.1% aqueous solution of the reaction product has a surface tension of 36 dynes/cm. at 25° C. The product is extremely soluble in water and upon shaking an aqueous solution of the product there is formed a dense, stable foam.

*Example 5.—Preparation of N-lactobionyl stearyl polyglycyl glycinate*

Into a reaction vessel equipped with a stirrer, thermometer and reflux condenser there was placed 3 g. of the stearyl alcohol ester of polyglycyl glycine containing an average of 5 glycine units, dissolved in anhydrous methanol. There was next added 3 g. of lactobionic acid delta lactone and the mixture was refluxed until neutral. Unreacted lactone was separated by filtration from the hot reaction mixture. On cooling the clear filtrate, a white solid precipitated which was isolated and purified. The yield was approximately 40% of theoretical.

The white solid is an extremely water-soluble material having a melting point of 96° to 98° C. The surface tension of a 0.1% aqueous solution of the product is 49 dynes/cm. at 25° C.

*Example 6.—Preparation of N-glucuronyl stearyl glycinate*

Into a reaction vessel equipped with a stirrer, thermometer and reflux condenser there was placed 9.7 g. of stearyl glycinate, 5.28 g. of glucuronyl-gamma-lactone and a quantity of anhydrous ethylene glycol monomethylether. The resulting mixture was heated with continuous stirring at 60° C. for about 3½ hours at which point the mixture became neutral.

Following the procedure of Example 1, a slightly tan colored, solid material having a melting point of 70° to 75° C. was isolated. The surface tension of a 0.1% aqueous solution of the compound is 46 dynes/cm. at 25° C. The yield was approximately 70% of the theoretical yield.

*Example 7.—Preparation of an N-lactobionyl derivative of the stearyl ester of an amino acid mixture obtained from casein*

A quantity of mixed amino acids was obtained by the acid hydrolysis of casein. The crude hydrolysate was purified and there was obtained a white solid having the following analysis:

|  | Percent |
|---|---|
| Total solids | 96.14 |
| Total nitrogen | 12.71 |
| Amino nitrogen | 6.95 |
| Ash | 1.32 |
| Arginine | 3.74 |
| Aspartic acid | 1.76 |
| Cystine | 0.08 |
| Glutamic acid | 17.20 |
| Glycine | 1.90 |
| Histidine | 2.78 |
| Isoleucine | 5.50 |
| Leucine | 9.27 |
| Lysine | 9.12 |
| Methionine | 2.33 |
| Phenylalanine | 4.32 |
| Proline | 11.34 |
| Serine | 7.04 |
| Threonine | 3.59 |
| Tyrosine | 3.57 |
| Valine | 6.66 |

The mixed amino acids were esterified with stearyl alcohol in the presence of an acidic catalyst. The intermediate product, a mixture of amino acid stearyl esters, was isolated both in the form of an acid salt and a free base.

Into a reaction vessel equipped with a stirrer, thermometer and reflux condenser there was placed 4.0 g. of the mixed stearic esters dissolved in absolute methanol. Following the procedure of Example 1, the mixed stearyl esters were reacted at reflux temperature with 3.4 g. of lactobionic acid delta lactone and the reaction mixture became neutral after about 2 hours. On cooling the reaction mixture, a waxy material separated which was isolated by filtration and washed with methanol and ether. The yield was approximately 3.2 g.

The reaction product is a slightly tan colored solid having a melting point of about 70° C. and containing about 1.3% to 1.4% nitrogen. The surface tension of a 0.1% aqueous solution of the product is 55 dynes/cm. at 25° C. The material forms viscous solutions in water and is soluble in alcohols and in a large number of edible fats and oils.

The emulsifying ability of the compounds of the present invention has been established in various systems including benzene-water, ligroin-water, water-insoluble phenolic derivatives-water, mineral oils-water, soybean oil-water, castor oil-water, hydrogenated vegetable fats-water, ice cream mixes, salad oils etc.

In general the compounds of the present invention exhibit in varying degrees the property of forming cloudy, soap-like, colloidal, aqueous solutions of relatively high viscosity and gel-forming ability. Compounds in which the esterifying radical is comparatively low, i. e., lauryl, have a strong tendency for the formation of stable foams in aqueous systems.

Because of the above properties, the compounds are useful as emulsifying and/or dispersing agents in the food, textile and similar industries.

The term "amino acid higher aliphatic ester" employed in this specification and claims includes linear polymers of such esters which are reactive with the aldonic acid compounds.

It is intended to cover all changes and modifications in the examples of the invention, herein given for purposes of illustration, which do not constitute departure from the spirit and scope of the appended claims.

I claim:

1. An N-aldonyl alkyl ester in which the alkyl radical has from 12 to 18 carbon atoms of an alpha amino carboxylic acid selected from the class consisting of α-amino carboxylic acids present in casein.

2. An N-aldonyl octadecyl ester of an alpha amino carboxylic acid selected from the class consisting of α-amino carboxylic acids present in casein.

3. An N-aldonyl lauryl ester of an alpha amino carboxylic acid selected from the class consisting of α-amino carboxylic acids present in casein.

4. An N-lactobionyl alkyl ester in which the alkyl radical has from 12 to 18 carbon atoms of an alpha amino carboxylic acid selected from the class consisting of α-amino carboxylic acids present in casein.

5. An N-gluconyl alkyl ester in which the alkyl radical has from 12 to 18 carbon atoms of an alpha amino carboxylic acid selected from the class consisting of α-amino carboxylic acids present in casein.

6. An N-aldonyl glycine alkyl ester in which the alkyl radical has from 10 to 18 carbon atoms.

7. An N-aldonyl polyglycyl glycine alkyl ester in which the alkyl radical has from 12 to 18 carbon atoms.

8. An N-lactobionyl alkyl ester of polyglycyl glycine in which the alkyl radical has from 12 to 18 carbon atoms.

9. The N-lactobionyl stearyl esters of hydrolyzed casein mixed amino acids.

10. N-lactobionyl octadecyl glycinate.

11. N-lactobionyl lauryl glycinate.

References Cited in the file of this patent

Van Wijk: Rec. trav. Chim. des Pays-Bas, vol. 40, pages 226–7.